(12) United States Patent
Khorramshahi

(10) Patent No.: US 7,499,762 B2
(45) Date of Patent: Mar. 3, 2009

(54) INTELLIGENT GRID SYSTEM

(75) Inventor: Ali Khorramshahi, Baltimore, MD (US)

(73) Assignee: Digitalogic, Inc., Baltimore, MD (US)

( * ) Notice: Subject to any disclaimer, the term of this patent is extended or adjusted under 35 U.S.C. 154(b) by 0 days.

(21) Appl. No.: 11/384,488

(22) Filed: Mar. 21, 2006

(65) Prior Publication Data

US 2007/0226290 A1 Sep. 27, 2007

(51) Int. Cl.
*G06F 19/00* (2006.01)
*G05B 11/01* (2006.01)

(52) U.S. Cl. .................. 700/22; 709/249; 340/870.07

(58) Field of Classification Search ............ 700/19–22, 700/286–298; 706/10, 11, 903, 904, 906–909; 709/201–203, 220–226, 230–237, 249; 710/100, 710/104–106, 305, 306, 311–315; 340/870.01–870.07; 379/106.03, 106.04, 219, 221.08–221.12, 379/900, 901
See application file for complete search history.

(56) References Cited

U.S. PATENT DOCUMENTS

| | | | | |
|---|---|---|---|---|
| 6,134,124 A * | 10/2000 | Jungreis et al. | ............... | 363/34 |
| 6,285,178 B1 * | 9/2001 | Ball et al. | .................... | 323/351 |
| 6,459,997 B1 * | 10/2002 | Andersen | ..................... | 702/57 |
| 6,850,252 B1 * | 2/2005 | Hoffberg | ................... | 715/716 |
| 6,965,319 B1 * | 11/2005 | Crichlow | ............... | 340/870.02 |
| 7,124,119 B2 * | 10/2006 | Bigus et al. | .................... | 706/10 |
| 7,174,393 B2 * | 2/2007 | Boucher et al. | ............. | 709/250 |
| 7,184,903 B1 * | 2/2007 | Williams et al. | ............... | 702/60 |
| 2002/0036430 A1 * | 3/2002 | Welches et al. | ................ | 307/18 |
| 2002/0064010 A1 * | 5/2002 | Nelson et al. | .................. | 361/64 |
| 2003/0113067 A1 * | 6/2003 | Koh et al. | ...................... | 385/48 |
| 2003/0144864 A1 * | 7/2003 | Mazzarella | ..................... | 705/1 |
| 2003/0212494 A1 * | 11/2003 | Alexander et al. | ............. | 702/5 |
| 2004/0003132 A1 * | 1/2004 | Stanley et al. | ............... | 709/316 |
| 2004/0032168 A1 * | 2/2004 | Allison et al. | ................. | 307/64 |
| 2004/0263116 A1 * | 12/2004 | Doruk et al. | ................. | 320/107 |
| 2005/0154499 A1 * | 7/2005 | Aldridge et al. | ............. | 700/286 |
| 2005/0280528 A1 * | 12/2005 | Olsen et al. | .................. | 340/531 |
| 2006/0103546 A1 * | 5/2006 | Salser et al. | ........... | 340/870.02 |
| 2006/0165040 A1 * | 7/2006 | Rathod et al. | ............... | 370/335 |
| 2006/0271563 A1 * | 11/2006 | Angelo et al. | ............... | 707/100 |

\* cited by examiner

*Primary Examiner*—M. N. Von Buhr
(74) *Attorney, Agent, or Firm*—MaxValueIP LLC

(57) ABSTRACT

The future of the utility industry will be defined by how its leaders can transform the grid from a "passive" network of cables, wires, poles, and other hardware to a self-aware and fully controllable grid system—an Intelligent Grid System (IGS). We will discuss a novel set of design guidelines for utilities (and other industries) to build their own Open Intelligent Grid System with the lowest possible risk and cost, while achieving the architectural criteria, technical features and functions required. We will discuss how to avoid the dead ends to which limited design and architecture can lead, and we will lay out the design solutions that will overcome the business and technical challenges posed by an array of technology products and business imperatives. Using IGIN (Intelligent Grid Interface Node), one can integrate or connect hybrid networks for different purposes, such as power electric industry, telecommunication, computer network, and Internet.

20 Claims, 5 Drawing Sheets

IGIN Sample Architecture (simplified)

Flexible Hybrid Network that networks the devices, systems, and standard networks

| Typical Field Devices | Typical Device Hardware Features | Symbol | Description | Symbol |
|---|---|---|---|---|
| •Switch Controller<br>•Recloser Controller<br>•Protection Relay<br>•Meter | •Faceplate for user interface.<br>•I/Os to connect to Field equipment.<br>•Serial Ports for programming and configuring and communications. | Device | •Private networks such as LAN, WAN, Intranet, Harmony, Canopy, microwave, fiber,….<br>•Public Networks such as Verizon, ATT, Sprint, Nextel | Network |

| Typical Communications Devices | Symbol | Description | Symbol |
|---|---|---|---|
| •Modems<br>•Routers<br>•Switches<br>•Leased phone lines<br>•Dial up<br>•Short haul<br>•T1Line<br>•Fiber Optics<br>•Ethernet<br>•Data radio | Com | •IGIN follows open standard hardware platform.<br>•Available from many manufacturers<br>•Includes standard OS<br>•Support for serial, IP, and other standard ports<br>•"client ownership" of application | I |
| | | •Proprietary hardware such as Motorola MOSCAD<br>•Provides limited automation flexibility | P |

Fig. 1

INTELLIGENT GRID SYSTEM

BACKGROUND OF THE INVENTION

The grid is possibly the most important asset and area of greatest investment for any utility company. As the main "artery" for carrying the energy commodity from principal generation sources, it connects a range of facilities such as substations, switchyards, and power plants to one another, and delivers power to public, private, and municipal end user load centers.

The future of the utility industry will be defined by how its leaders can transform the grid from a "passive" network of cables, wires, poles, and other hardware to a self-aware and fully controllable grid system—an Intelligent Grid System (IGS).

Challenges: A complicating factor is the imperative to design and build an Intelligent Grid System that will hold viable not just for today, but for several decades to come. As utility industry leaders make decisions about investing capital and resources in new technologies, it is essential to consider how today's standards and technologies will integrate with tomorrow's different and/or better ones. Will standard or design "A" go in the direction of design "B" or design "C"?

If today's design and system architecture choices are not aligned with emerging technologies, the bottom line as well as human resource management and future industry progress will be profoundly and negatively impacted. Likewise, sound judgments about building a system foundation that is flexible enough to maintain a constant alignment with the change in technology will be rewarded.

Utility leaders are faced with the complex challenge of selecting the right products, partners, and solutions for the task. They have rightfully concluded that investing large sums of capital or dealing with a well-known company will not necessarily guarantee the desired business results at the end of the project.

Others have done some work in this area:

Kahle (Compulog Corporation, U.S. Pat. No. 5,270,576) teaches an electrical connector network for coordinately controlling multiple electrical appliances connected to the network. The network includes a control outlet and at least one slave outlet.

Willette (The Whitaker Corporation, U.S. Pat. No. 5,599,190) teaches a communication wiring system which includes a communication network interface device for routing a plurality of source signals between respective plurality of types of electrical sources and a number of reconfigurable outlet assemblies.

Stewart et al. (Echelon Corp., U.S. Pat. No. 5,812,557) teaches a power line communication analyzer (PLCA) which provides a signal strength metering system and selectable signal attenuation functions for adjusting the transmitting unit's attenuation and measuring error rate without the need for the user to be present at both sending and receiving locations under test.

Abraham (Videocom, Inc., U.S. Pat. No. 6,014,386) teaches a communication network which includes an information signal line which carries a plurality of selectable information signals. An electric line distribution panel connects the information signal line and the electrical line for distributing the selectable information signals over the electrical line to the location of a given electrical outlet.

Lutz, Jr., et al. (Cisco Technology, Inc., U.S. Pat. No. 6,239,672) teaches a wall mount filter which includes a wall mount plate to which a connection port is coupled.

Curt et al. (Shenandoah Electronics Intelligence, Inc., U.S. Pat. No. 6,360,177) teaches a portable unit, preferably adapted for plugging into a common wall outlet, which has circuitry for monitoring the voltage and/or current provided through an electrical outlet.

Jones et al. (Teal Corporation Limited, U.S. Pat. No. 6,373,928) teaches a method of controlling the power supply to an electrical device through a telecommunication network.

Corner (Comcircuits, U.S. Pat. No. 6,417,762) teaches a system for transmitting and receiving high frequency electrical communication signals over a previously installed building power line network.

Clapp, Jr., et al. (Corning Cable System LLC, U.S. Pat. No. 6,457,874) teaches a mixed media outlet which can be mounted on the wall and includes ports for separate access to an electrical network and optical network.

Mowery, Jr. (U.S. Pat. No. 6,492,897) teaches a system for communicating information to and from untethered subscriber devices and tethered devices by the use of a power transmission line communication system interfacing to a conventional electric power distribution network.

Walbeck et al. (Easyplug Inc., U.S. Pat. No. 6,747,859) teaches a modular feed-through adapter that allows an electrical connection to a power line network adapter without using up an electrical outlet.

However, none of these inventions can attack the problem on a large scale, comprehensively, efficiently, and completely. The current invention offers a flexible architectural design for applying technology to transform today's grid into an Intelligent Grid for the $21^{st}$ century. The document charts the direction and creates a roadmap to which utilities can fulfill their vision, while avoiding the risks and unnecessary expenses that may occur when implementing technological solutions. This invention is a blueprint for transforming today's passive grid into a self-aware and fully-controllable grid system.

Computer Evolution as a Model and a Vehicle for an Open Intelligent Grid System

We have all witnessed the evolution of computers from enormous devices that required whole rooms to house them to micro-processing hand-held units with more capacity than anyone could have imagined in the 70s or even 80s.

Now, a wide range of manufacturers build standard personal and mobile computers, and every year, better and more powerful computers are introduced to the market. They are more cost-effective and work better than their predecessors. Plus, they are highly compatible with each other, regardless of their vintage.

Competition has improved the power and quality of hardware and reduced the cost of ownership. Vendors and programmers can write a wide range of applications that run on standard computer hardware. Even though new software, security, and hardware standards are introduced to the field every year, existing computer hardware is capable of accommodating them whether they are mechanical, electro-mechanical, or microprocessor-based. (e.g., wireless modems can be easily added to laptops and PCs to create wireless LAN.) The key to this flexibility is an open platform that offers standard connectivity with the existing hardware.

A Foundation for an Intelligent Grid System

Because of the evolution of computer and communication technologies, utilities have been able to improve and enhance service to their customers, simplify work processes, and reduce costs in the areas of system planning, operation, and maintenance of their core infrastructure.

Some electric utilities have already partially applied technologies for the following applications, processes, and concepts that attempt to transform today's Grid to an Intelligent Grid System by:

- Managing voltage and Voltage Ampere Reactive (VARs) on the distribution grid by automating the control of capacitor banks and regulators or performing automatic switching of load.
- Managing loads to better meets electric energy supply and demand through real-time transfer and/or dropping of loads by automatically opening and closing breakers and switches.
- Supporting the residential, commercial, and industrial clients more efficiently and cost-effectively by automating the meter reading and remote connection and disconnection of electric services.
- Improving the reliability and response to outages by automating the process of outage detection and restoration by automating the switching of distribution system.

Further developments that can be achieved through the establishment of an Intelligent Grid include:

- The removal of the final barrier between the Utility's core infrastructure system and the clients who receive service from the infrastructure by providing broadband data communication channels to the clients.
- The establishment and implementation of a reliable, wide communication channel to the clients to enable utilities to better service and support the clients by offering monitoring and management of the appliances used in private homes, as well as commercial and industrial facilities. A collateral benefit would be the improvement of load management by remotely monitoring and controlling appliances.
- An opportunity for clients to use the broadband data channels as an option for connectivity to the Internet or other public and private networks.

SUMMARY OF THE INVENTION

Design and Architecture

We will discuss a novel set of design guidelines for utilities (and other industries) to build their own Open Intelligent Grid System with the lowest possible risk and cost, while achieving the architectural criteria, technical features and functions required. We will discuss how to avoid the dead ends to which limited design and architecture can lead, and we will lay out the design solutions that will overcome the business and technical challenges posed by an array of technology products and business imperatives.

BRIEF DESCRIPTION OF THE DRAWINGS

FIG. 1 shows the figure captions and description of the symbols for the other figures.

DETAILED DESCRIPTION OF THE PREFERRED EMBODIMENTS

Architecture of an Intelligent Grid System

Figure 2:
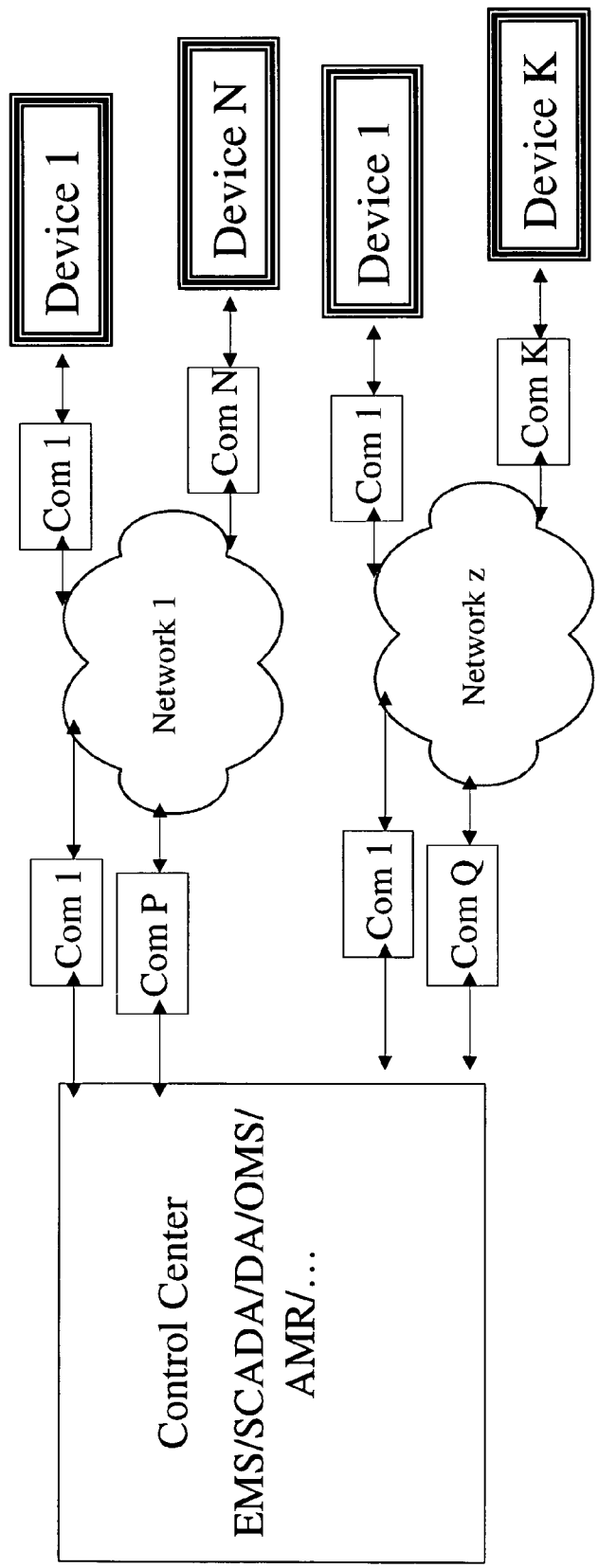
FIG. 2 shows a traditional Utility Automation Architecture (simplified), as prior art.

Here is the description of the one of the embodiments of this invention:

Our approach to the Intelligent Grid System architecture is to create a grid that is self-aware and remotely and/or automatically controllable. To achieve this, the architecture is capable of using any available equipment, device, system, and communications network.

The architecture can deliver connectivity and communications from devices to systems and vice versa. The connectivity and communications may be routed through a virtual path that is a collection of several media (e.g. serial and IP based fiber optic, wired, and radio channels, microwave, private networks such as LAN, WAN, Intranet, Motorola Harmony, Motorola canopy, and M/A-COM OpenSky, or public networks such as Verizon, Nextel, and etc.).

The architecture is also capable of supporting any future wideband data path to utility clients for other uses, such as connectivity to the Internet or other private and public networks. The following is a sample of elements that the architecture encompasses: (This is one of the embodiments, and it is given as an example.)

- Grid field equipment such as breakers, reclosers, switches, capbanks, regulators, etc.
- Grid field devices such as relays, meters, recloser controllers, switch controllers, capbank controllers, sensors and fault detectors.
- Systems, such as automated meter reading, VAR and voltage control, outage management, SCADA (Supervisory Control and Data Acquisition, for remotely monitoring and controlling), energy management, work management, customer information, advance applications, planning, etc.
- Communication infrastructure such as fiber, microwave, wire-line, and radio networks, which can be privately and/or publicly-owned systems.
- Wideband data access to load centers.

Architectural Criteria for Overall Design and an Open Intelligent Grid System Here is the description of the one of the embodiments of this invention:

The following is a set of architectural and design criteria for building an Intelligent Grid System at the lowest possible risks and costs:

- Avoid technology obsolescence
- Maintain compatibility with the future communication and device technologies
- Reduce the number of hardware and devices that perform redundant or overlapping functions at the remote and central sites
- Consolidate hardware and system functions
- Consolidate applications that run on the hardware
- Accept future introduction of new devices
- Accept future introduction of communications standards and protocols on the same hardware
- Accept integration of future hardware sensors and devices
- Accept introduction of future security standards on the same hardware.
- Support a fast learning curve for the personnel who will support, use, and maintain the system Small number of personnel can support a wide range telecommunication and device applications Small number of personnel can support extremely large number of remote sites with different telecommunications connectivity and utility applications Develop and apply new automation applications Accommodate lacking features and functions of a desired device or communication hardware Avoid duplication of hardware, applications, user interfaces, etc.

The Essential Building Block of an Intelligent Grid: IGIN (Intelligent Grid Interface Node)

(Please note that IGIN is a term coined by the inventor of the current application. Any trademark and IP protection for that term belongs to the assignee of the current application.)

The content of this disclosure and invention is applicable to electric, water, gas, and oil utilities, and the vendors who provide equipment and systems to the utilities. It can also apply to other industries/businesses/models, such as Internet businesses, telecommunication, manufacturing sector/plants, and IT networks. For simplicity, and as an example and one embodiment, the focus of the disclosure and the examples and references are for electric utility systems and infrastructures.

Here is the description of the one of the embodiments of this invention:

IGIN is a flexible and smart element that can be added to field devices, computer, and telecommunication networks to create larger manageable and secure hybrid networks.

IGIN allows networks to support simultaneously low and high throughput data communication using IP and serial schemes over a wide range of wired and wireless media.

One example and embodiment of IGIN unit is based on an open computer hardware, with any operating system, such as open or standard operating system. Another example is a Single Board Computer (SBC) with an embedded standard OS, such as Windows CE.Net or Linux. Standard operating systems relieve the organization of tying core solutions to expensive propriety hardware that may become obsolete in a few short years. Additionally, standard operating systems, such as Windows CE.Net, can be loaded onto hundreds of different SBCs offered by different global manufactures. With its standard OS, IGIN automatically inherits a large set of advanced features and functions. The following list covers a partial set of its features:

Rich security features including application certifications that prohibit any non-certified code from running on the device providing a defense against virus attacks.

A modular operating system that allows system designers to exclude those features that are deemed to introduce security vulnerability to the system.

Very rich encryption and authentication methods.

Multiple built-in features such as web service, web server, SQL database support, SNMP, OBEX, FTP, etc.

Adding IGIN to the device-to-grid interfaces will add the required intelligence to the network very inexpensively. For example, IGIN that works under Windows CE.NET OS will provide the followings:

Security by using standard security features of Windows CE.NET.

This includes encryption and certification methods to cover confidentiality, authentication, and integrity. Availability will be provided by add-on applications that prevent event chattering.

Network management by using built-in SNMP.

Standard user interface by using web server or web services.

Standard tools by using built-in FTP server and built-in tools, such as ping and route trace.

Standard reporting based on Windows CE.NET capability to interface to SQL based databases.

Sequence of event and historic information using add-on application.

PAN network handling through OBEX or add-on application for ZigBee and the like.

Local logic by implementing local application on IGIN devices.

Multiple interrupt and priority levels that make the system suitable for real-time processing.

Creating Intelligent Grid architecture can start with the implementation of a single IGIN unit and can be expanded to include all elements of the grid. IGIN can be installed unit by unit over time, or it can be implemented in a shorter period of time by installing a large number of IGINs.

The core function of IGIN is to use all communication media that is owned by or available to a utility to provide seamless connectivity amongst the grid devices and utility systems, for example, EMS (Energy Management system), GIS (Geographic Information System), OMS (Outage Management System), DA (Distribution Automatic System), AMR, or CIS (Customer Information System). IGIN enables utilities to create a hybrid communication network, such as connecting fiber to wireless to power-line carrier to microwave to radios to other networks and systems.

In addition, IGIN can connect utilities to their clients by providing connectivity to appliances at homes, offices, and factories, while offering the clients wideband access to outside networks, such as the Internet.

As an example, IGIN is made of generic, standard, microprocessor-based hardware. It is a hardened generic computer that is designed for industrial applications. It can operate in extreme temperatures (−40° C. to +85° C.), in harsh environments. There are no moving components and/or parts in the IGIN hardware, therefore, there are no mechanical failures associated with wear and tear.

IGIN hardware has a proven track record in the automation industry, as well as in sensitive fields, such as medical equipment and military systems. Because of its standard generic nature, the IGIN hardware is manufactured by different vendors, and therefore, it is available in the market at low prices.

Figure 3:
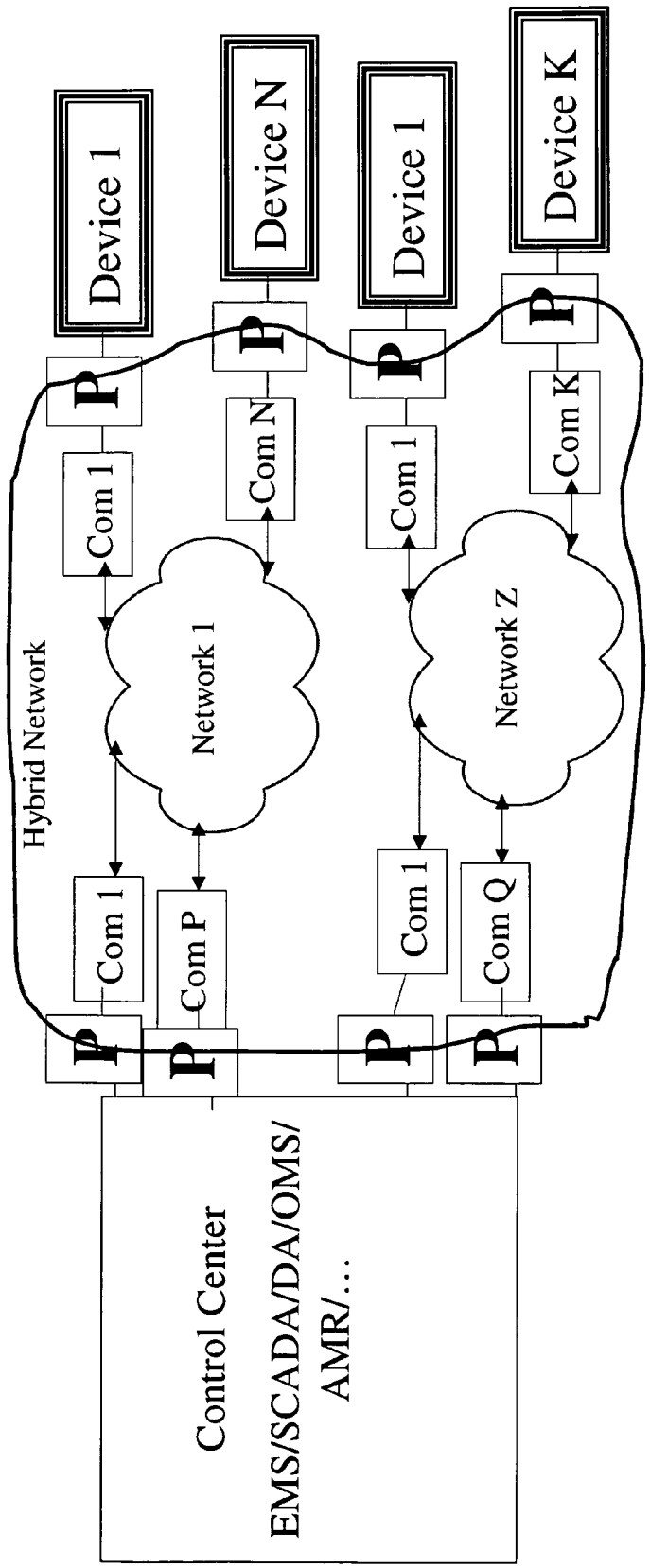
FIG. 3 shows a Utility Automation Architecture with limited flexibility (simplified), as prior art.

As one can see in FIG. 2, the prior art has the following features, which are disadvantageous:

Highly costly and time consuming to change communications and security standards No flexibility with the architecture No networks at the device level Expensive to manage and support No "client ownership" of the architecture No flexibility with communications ports and protocols FIG. 3 also shows the following features, which are overall disadvantageous in the prior art:

Highly costly and time consuming to change communications and security standards, though, it is better than traditional method Limited flexibility with the architecture Propriety network at the device level using serial ports with limited flexibility.

Easy to mange and support

Figure 4:
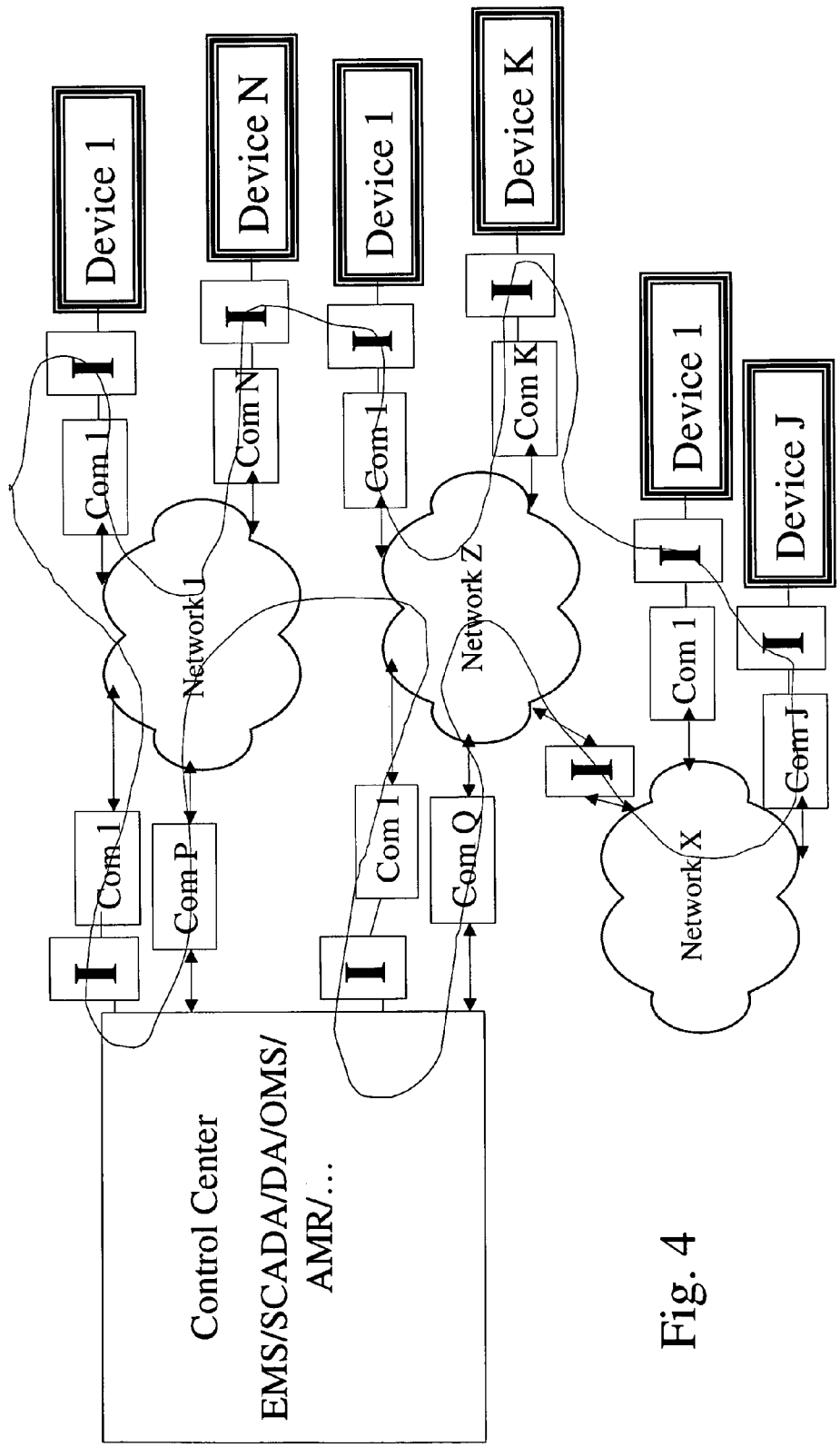
FIG. 4 shows an IGIN sample architecture (simplified), as one of the embodiments.
Figure 5:
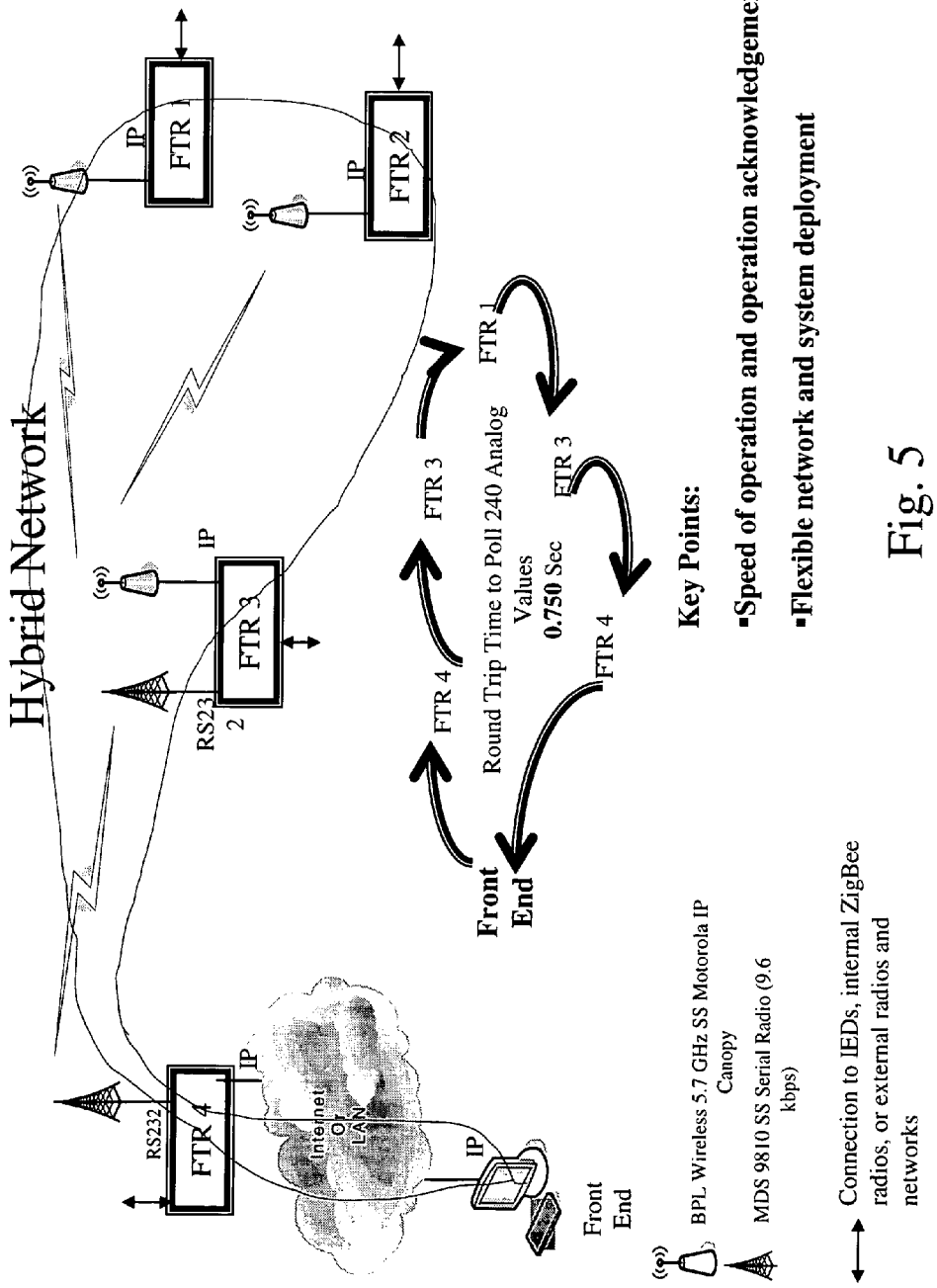
FIG. 5 shows a test of IGIN design at DigitaLogic, Inc.

"Client ownership" of the architecture, however no "client say" the future of the hardware Limited flexibility with communications ports and protocols Closed hardware with limited resources FIG. 4 shows the advantages of IGIN, which are as follows:
Low cost and less time to change communications and security standards
Maximum flexibility with the architecture
Flexible hybrid network at the device and external network levels using serial, USB, and Ethernet ports. Future port standard can be added as daughter boards
IP over serial and Ethernet ports
Easy to mange and support
"Client ownership" of the architecture
"Client say" the future of the hardware
Flexibility with communications ports and protocols
Standard hardware capable of expansion with hardware resources
Ease of support for AES and other security standards
Ease of implementation of new and future security standards
Ease of implementation of data privacy by restricting data type and communication path FIG. 5 shows the test of IGIN design at DigitaLogic, the assignee of the current invention, as one of the embodiments of the invention.

How to Build an IGIN

Here is the description of the one of the embodiments of this invention. Any other obvious variations are also intended to be covered by this current invention:

To build IGIN, one should choose to use the open and standard computer hardware with standard hardware ports and interface capabilities that network every device and elements of utility infrastructure using existing serial and IP standards. It is capable of routing data at high and low speeds from any location to any other locations through a hybrid communications networks. It can concentrate data and secure data communications. Its function can be extended to perform other functions, such as capbank and switch control. It can simultaneously communicate on different channels with different protocols.

Step 1:
Choose standard industrial-grade computer hardware with following specifications:
1) Offered by a wide range of national and global manufacturers
2) Has nonvolatile memory for hosting applications, storing data, etc.
3) Operates in extreme temperature (i.e. −30° C. to +75° C. or better). You may consider applying conformal coating, if it needs to operate in a highly humid environment.
4) Supports standard communication ports such as serial, USB, Ethernet, and fiber. The ports that are not available on the hardware can easily be added as daughter-board later.

One of the best standards for such hardware is PC104, which is a single board computer (SBC) with a standard bus structure that allows other PC 104 hardware to be added to it.

SBC is an embedded microprocessor unit that like a computer has all necessary elements on a single board. These elements are RAM, flash file, I/O, serial port, Ethernet port, GPS, USB, and video interface. Of course, these descriptions are for one embodiment and an example for this invention.

The choice of a standard hardware such as PC 104 will enable you to add new functions that require new hardware to IGIN. For example, broadband over power line carrier (BPL) is becoming a viable solution for carrying data through power lines. The BPL hardware can be integrated with PC 104 or other computer standard hardware. This is true with new standards of Zigbee radios (a standard for radio). There are even more sensing and small control devices that will become available in the market using Bluetooth or other emerging technologies. These new devices have to comply with standard computer hardware platforms in order to become viable in the market. Therefore, choosing standard computer hardware, such as PC 104, safeguards against obsolescence. It also supports the future generations of hardware sensors or controllers.

There are other advantages to choosing standard computer such as PC 104. The cost of the hardware is extremely low because it is easy to build, and there are many different manufacturers that are building such hardware. It is easy to package it in different form factors, to suit different installation requirements. The application of the hardware can be expanded to perform other functions and replace other hardware, such as capbank and switch control. This will result in great savings.

It is easy to avoid the replication of hardware because the utility can specify vendors to provide metering (for both usage and operational purposes, for example, voltage meter or VAR meter) and control applications to run on the standard hardware.

DigitaLogic (the assignee of the current invention) has used the single board PC 104 standard hardware for other advanced integration solutions. We are currently marketing our solutions on PC 104 as FlexiTEAM Remote (FTR). (FlexiTEAM is a product and trademark belonging to the assignee of the current application.) The choice of hardware has enabled us to quickly expand the applications that run on FTR. For example, we have successfully added two brands of low-cost, low-powered radios for a substation wireless SCADA application. The work that we did in two weeks might take years for the manufacturers of controllers to achieve. It is important to note that sometimes the manufacturer of a controller of your choice may never include new communications standards in its products. By choosing a standard hardware for implementing IGIN in your design, you buy the controllers from manufacturer of your choice, and implement the communications standard at your desired time on IGIN, to meet your needs and requirements.

Step 2:
As an example, choose an operating system, such as a standard embedded operating system (OS), such as Microsoft Windows CE.net or Linux.

Embedded and real-time operating systems are evolving with a fast pace. Microsoft started entering embedded environment a long time ago. Microsoft has introduced Windows CE and Windows XP embedded. Linux also is grabbing a great share of embedded systems. There are many other well-known and proven operating systems that are in competition with these two. This competition has resulted in enhancing embedded operating systems features. The current embedded systems are capable of modern file management, complex user interfaces, telnet, ftp, network management and SNMP, security (encryption and authentication), user management, web and web services, SQL databases, and many more. We will discuss these features in following sections.

Standard OS supports standard programming tools. Therefore, new applications are developed faster and at lower costs. Standard OS supports the new emerging standards in communications, protocols, security, and programming tools and techniques.

DigitaLogic (the assignee of the current invention) has used Windows CE.net on FTR. It has helped us to shorten our application development time and reduce costs. For example, the new security standards and web browsing functions are intrinsic to the OS. We did not have to perform any development work in this area. The features and functions have been available to us for our immediate use. This significantly reduces costs and the implementation time, while it follows standard application programming.

Step 3:

Provide IGIN suite of applications that will deliver the following capabilities and functions:

1. Makes it possible for devices to connect to systems or other devices
2. Enables routing of data from one medium to another
3. Performs the conversion, encapsulation, and emulation of protocols
4. Is equipped with a real-time database to support managing of data traffic from different ports and media.
5. Has a set of simple tools to configure and manage IGIN and its hybrid network
6. Includes programming tool for implementing local logic (Some examples for IGIN suite of applications is Front End Communications Processor (FECP), Remote Terminal Unit (RTU), Programmable Logic Control (PLC), Intelligent Electronic Device (IED), Capacitor Bank Controller, and Metering. Note that the different applications can be installed on different IGIN, however, the user uses the same familiar tools to manage and support IGINs. Regardless of their applications, the IGINs are equipped with the same networking and communications capabilities for transparently communicating with one another, while each IGIN will follow its own privacy and security rules and algorithms for exchanging all or portion of data.)

In one embodiment, IGIN applications are developed on standard programming languages that can easily be modified and supported by a wider range of programmers.

As an example, DigitaLogic's FTR (the assignee of the current invention) is capable of routing different protocols from one system to another. It can connect devices through different communication medium. FTR brings ownership and control of data to its user. The data that enters FTR through its ports will be in control of FTR. The user will have full ownership and control of data. The user can configure the system to route the data or perform some local calculations or intelligent processing with the data before routing it to another device or system.

Step 4:

Apply IGIN to the interfaces between grid field devices and the grid communication systems. The use of IGIN at as many interfaces as possible will create the hybrid network architecture with complete control and ownership of data in the hands of the end-user. Because IGIN is a computer (in this embodiment), most other hardware for field device controllers can be eliminated, and their functions can be ported to IGIN. Here are some examples of hardware whose applications can be consolidated to run on IGIN, therefore, eliminating the duplicate hardware:

Capbank controllers. An IGIN can perform the capbank controller functions. Add an I/O board to the IGIN hardware to perform the switching and I/O functions. The highly programmable IGIN hardware can accept capbank controller applications.

Automated Meter Reading Gateways or Collectors. Install the meter data collector functions on IGIN. Typically, the data for several meters is collected by a device and then reported to the metering central server. IGIN can accept most of the radios that the meters use for communications. Install the radio on IGIN and provide the data collection application on IGIN.

BPL applications. Imagine using IGIN to perform metering functions with a BPL modem hardware. IGIN becomes your intelligent meter, a router to home equipment and appliances, and a bridge to the outside world. This feature alone can profoundly change the technology applications in the utility industry and their connections to their clients.

Security and Privacy Issues

Using the rules, signature, Digital Rights Management (DRM), and encryption schemes available in the market, such as PKI and RSA, one can add the layers for privacy and security in this system, so that the flow of information is restricted, monitored, or pre-authorized. This way, the owner of the content can customize who can access what, and under what conditions, and when.

Any other obvious variations or types of the features described above are also intended to be covered by the current invention and claims.

What I claim as my invention is:

1. A method for the transmission of current, utility commodity, data, and information, said method comprising the following steps:

transmitting current, utility commodity, data, and information through a grid, wherein said grid comprises one or more intelligent grid interface nodes, and wherein said one or more intelligent grid interface nodes are located at some points on said grid;

said one or more intelligent grid interface nodes connecting or exchanging data, on a two-way communication basis, among one or more different subsystems with one or more different characteristics, hardware, software, interfaces, connections, applications, communications, and protocols;

wherein said one or more intelligent grid interface nodes are compatible with respect to said one or more different characteristics, hardware, software, interfaces, connections, applications, communications, and protocols;

wherein said grid further comprises one or more devices, wherein said one or more devices comprise: a switch, protection relay, meter, sensor, operating means, protecting means, regulating means, distributing means, measuring means, pricing means, tracking means, telecommunication means, computing means, and managing means, wherein said one or more devices are connected to or associated with said one or more intelligent grid interface nodes;

managing voltage and voltage ampere reactive on said grid by controlling of capacitor banks and regulators and switching of loads;

managing said loads to meet electric energy supply and demand through real-time transfer and dropping of said loads by opening and closing breakers and switches;

remotely reading said meter and remotely connecting and disconnecting of electric services;

detecting an outage and restoring by switching of a distribution system;

providing broadband data communication channels to clients, over power line carrier;

remotely monitoring and managing appliances for load management;

interfacing with components of said one or more intelligent grid interface nodes, said components comprising: Energy Management system, Geographic Information System, Outage Management System, Distribution Automatic System, and Customer Information System;

performing conversion, encapsulation, and emulation of said protocols;

providing a set of tools to configure and manage said one or more intelligent grid interface nodes and to implement local logic;

providing programming tools, for management of Front End Communications Processor, Remote Terminal Unit, Programmable Logic Control, Intelligent Electronic Device, Capacitor Bank Controller, and Metering; and said one or more intelligent grid interface nodes automating, speeding up, optimizing, remotely controlling, and streamlining one or more functions performed by said one or more devices.

2. A method as recited in claim 1, wherein said one or more functions performed by said one or more devices is meter reading.

3. A method as recited in claim 1, wherein said one or more intelligent grid interface nodes remotely control or automate a meter reading.

4. A method as recited in claim 1, wherein said grid is a utility grid.

5. A method as recited in claim 1, wherein said grid is a telecommunication grid.

6. A method as recited in claim 1, wherein said grid is an information technology grid.

7. A method as recited in claim 1, wherein said grid is an Internet-based grid.

8. A method as recited in claim 1, wherein said grid is an electric power grid.

9. A method as recited in claim 1, wherein said one or more intelligent grid interface nodes comprise an electronic component.

10. A method as recited in claim 1, wherein said one or more intelligent grid interface nodes comprise a software component.

11. A method as recited in claim 1, wherein said grid comprises a computer network.

12. A method as recited in claim 1, wherein said grid comprises a telecommunication network.

13. A method as recited in claim 1, wherein said grid comprises a utility grid.

14. A method as recited in claim 1, wherein said grid comprises a computer hardware.

15. A method as recited in claim 1, wherein said grid comprises an operating system.

16. A method as recited in claim 1, wherein said grid comprises a suite of applications or programming tools.

17. A method as recited in claim 1, wherein said one or more intelligent grid interface nodes are applied between grid field devices and/or grid communication systems.

18. A method as recited in claim 1, wherein said grid comprises wired or wireless media.

19. A method as recited in claim 1, wherein said grid comprises a security module or a software-based component.

20. A method as recited in claim 1, wherein said grid comprises a hybrid communication network.

* * * * *